United States Patent
Rothschild et al.

(10) Patent No.: US 8,503,606 B2
(45) Date of Patent: Aug. 6, 2013

(54) LOW-COST POSITION-SENSITIVE X-RAY DETECTOR

(75) Inventors: Peter J. Rothschild, Newton, MA (US); Samuel J. Petuchowski, Brookline, MA (US)

(73) Assignee: American Science and Engineering, Inc., Billerica, MA (US)

( * ) Notice: Subject to any disclaimer, the term of this patent is extended or adjusted under 35 U.S.C. 154(b) by 157 days.

(21) Appl. No.: 13/109,063

(22) Filed: May 17, 2011

(65) Prior Publication Data

US 2011/0293066 A1  Dec. 1, 2011

Related U.S. Application Data

(60) Provisional application No. 61/348,161, filed on May 25, 2010.

(51) Int. Cl.
*G01N 23/04* (2006.01)
*G01T 1/20* (2006.01)

(52) U.S. Cl.
USPC ............... 378/57; 378/62; 250/369; 250/362

(58) Field of Classification Search
USPC .................... 378/57, 62, 98.8, 98.3; 250/369, 250/362
See application file for complete search history.

(56) References Cited

U.S. PATENT DOCUMENTS

| | | | | |
|---|---|---|---|---|
| 3,878,373 A * | 4/1975 | Blum | | 250/303 |
| 5,249,216 A * | 9/1993 | Ohsugi et al. | | 378/46 |
| 5,483,081 A | 1/1996 | Hosoi | | 250/585 |
| 7,072,440 B2 * | 7/2006 | Mario et al. | | 378/57 |
| 2008/0253514 A1* | 10/2008 | Panesar et al. | | 378/57 |
| 2008/0279330 A1 | 11/2008 | Ueki | | 378/63 |
| 2011/0064193 A1* | 3/2011 | Minnigh et al. | | 378/62 |

FOREIGN PATENT DOCUMENTS

KR  2001-0087543  9/2001

OTHER PUBLICATIONS

Korean Intellectual Property Office *International Search Report and Written Opinion of the International Searching Authority*—International Application No. PCT/US2011/036739, dated Nov. 28, 2011 (9 pages).

* cited by examiner

*Primary Examiner* — Irakli Kiknadze
(74) *Attorney, Agent, or Firm* — Sunstein Kann Murphy & Timbers LLP

(57) ABSTRACT

A detector and methods for producing x-ray images, more particularly based on x-rays transmitted through an inspected object. A scintillating region is translated along a path within a cross section of a beam, the cross section taken in a plane distal to the object with respect to a source of the beam. Light emitted by the scintillator region is detected, thereby generating a detection signal, the detection signal is received by a processor which generates an image signal, and an image depicting transmitted penetrating radiation is formed on the basis of the image signal.

16 Claims, 5 Drawing Sheets

LOW-COST POSITION-SENSITIVE X-RAY DETECTOR

The present application claims priority from U.S. Provisional Application No. 61/348,161, filed May 25, 2010, which is incorporated herein by reference.

TECHNICAL FIELD

The present invention relates to systems and methods for producing x-ray images, and, more particularly, for producing images of x-rays transmitted through an inspected object.

BACKGROUND ART

Spatial resolution is typically obtained in x-ray transmission images either by means of a segmented detector, where pixels are illuminated in parallel by means of a fan- or cone-shaped x-ray beam, or else by means of a pencil beam that is scanned across an inspected object in a raster fashion. In some applications, transmission images are still obtained by exposure of an x-ray sensitive film. Segmented detectors are costly, whereas the mechanical structure required for collimating and scanning a pencil beam is not only costly but also heavy and cumbersome.

SUMMARY OF CERTAIN EMBODIMENTS OF THE INVENTION

In various embodiments of the present invention, an imaging apparatus is provided for imaging transmission of penetrating radiation through an object. The apparatus has a scintillator region, adapted for translation along a path within the illuminated cross-section of a beam of penetrating radiation. A photodetector detects light emitted by the scintillator region as a function of time, and generates a detection signal corresponding to each position of the scintillator region within the beam cross-section, which is received by a processor, and serves, in turn, to generate an image signal. Finally, the apparatus has a display for depicting an image of the transmitted penetrating radiation based on the image signal. Additionally, the apparatus may have a source for generating the beam of penetrating radiation, with respect to which the scintillator region moves in a plane distal to the object with respect to the source.

In accordance with alternate embodiments of the invention, the source of penetrating radiation may be an x-ray fan beam source. The scintillator region may be a phosphor dot or strip, and may be translated over a portion, up to an entirety, of the beam cross-section, on a belt, or otherwise. A sensor may determine an instantaneous disposition of the scintillator region with respect to the beam of penetrating radiation. The scintillator region may be a portion of a pattern progressively exposed to the beam. The phosphor dot may be exposed to the beam at a glancing angle with respect to a direction of motion of the dot.

In accordance with further embodiments of the invention, a method is provided for imaging transmission of penetrating radiation through an object. The method has steps of:
  a. translating a scintillator region along a path within a beam cross-section of a beam of penetrating radiation in a plane distal to the object with respect to the source;
  b. detecting light emitted by the scintillator region and generating a detection signal; and
  c. receiving the detection signal and generating an image signal; and
  d. depicting an image of the transmitted penetrating radiation based on the image signal.

Generating the beam of penetrating radiation may be an additional component step of the invented method.

BRIEF DESCRIPTION OF THE DRAWINGS

The foregoing features of the invention will be more readily understood by reference to the following detailed description, taken with reference to the accompanying drawings, in which.

DETAILED DESCRIPTION OF SPECIFIC EMBODIMENTS

Figure 1:
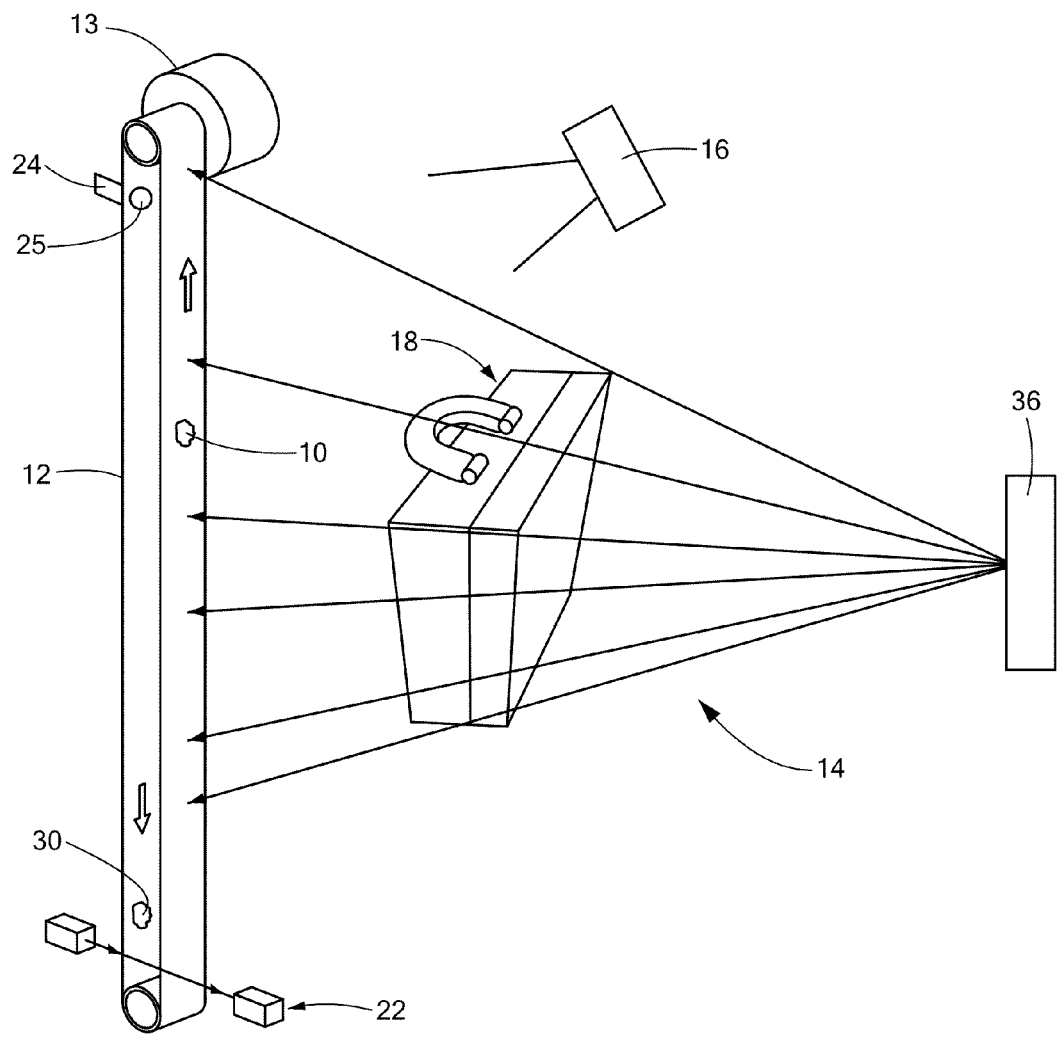
FIG. 1 is a perspective depiction of an apparatus for imaging contents of an object in x-ray transmission, in accordance with an embodiment of the present invention.

As used in this description and in the appended claims, the term "image" refers to any representation, in one or more dimensions, whether in tangible or otherwise perceptible form or otherwise, whereby a value of some characteristic is associated with each of a plurality of locations corresponding to dimensional coordinates of an object in physical space, though not necessarily mapped one-to-one thereonto. Similarly, "imaging" refers to the rendering of a stated physical characteristic in terms of one or more images.

In accordance with preferred embodiments of the present invention, a simple and low-cost method is provided for replacing an expensive segmented detector array for acquiring transmission images with a beam of penetrating radiation, such as x-rays. One embodiment of the invention is now described with reference to FIG. 1. A small piece of scintillating material 10 (such as a phosphor "dot" or strip) is driven along a path within a beam 14 of x-rays, generated by a source 36, and having a specified cross section such as that of a fan beam, for example. The cross-section is taken in a plane distal to the object with respect to source 36. In the embodiment shown in FIG. 1, phosphor dot 10 is coupled to a moving belt 12 and, by virtue of its motion with the belt, samples the intensity of beam 14, as transmitted through an object 18, as the dot 10 moves rapidly along the length of the beam cross section. Belt 12 is driven by drive motor 13. Other means for moving dot 10 within the region illuminated by beam 14 are within the scope of the present invention. For every integration time period (for example, every 16 microseconds), the intensity of emission of scintillation light from the piece of scintillator 10 is measured and recorded by a photo-detector 16, such as a Photomultiplier Tube (PMT). As the integration time period corresponds, roughly, to a resolution element, if the resolution is to be on the order of 1 mm, then the speed of moving dot 10 would be on the order of 60 m/s, although the scope of the present invention is limited in no way to any particular range of resolution or speed.

In the present description and in any claims appended hereto, the terms "dot" or "phosphor dot" may be used interchangeably with the term "piece of scintillator," "pixilated scintillation region," or the like. As the phosphor dot 10 moves along the entire length of the cross section of fan beam 14, the intensity of transmitted x-rays is measured as a function of position, allowing a one-dimensional attenuation profile of an illuminated object 18 to be acquired. Such a one-dimensional attenuation profile may be encompassed, herein, within the term "image," although it is generally intended that the examined object be translated in a direction transverse to the fan beam, thereby allowing a full two-dimensional image of the object to be formed. In a typical embodiment of the invention, belt 12 is polyurethane, or other elastomer, and is on the order of 2-5 mm wide.

By moving the object 18 through the fan beam 14, many such profiles can be combined to form a two-dimensional transmission image 20 (shown in FIG. 3) of an object. An optical sensor 22 may be used to read off the position of the phosphor dot 10 in order to ensure that the profiles are "stitched" together accurately into the final 2D image 20. Alternatively, a Hall sensor 24 may be used to create a reference signal when a piece of conductor (such as aluminum foil) 25 attached to the belt 12 passes the sensor 24, so that the position of the phosphor dot 10 relative to the fan beam 14 can always be determined.

In the embodiment of the invention depicted in FIG. 1, two phosphor dots 10 and 30 are used so that one of the dots is always being illuminated by the x-ray beam 14 at any time. In addition, each of the dots 10 and 30 can use a different type of phosphor, which preferentially absorbs different ranges of x-ray energies. This allows dual-energy transmission x-ray images to be acquired, where alternating scan lines in the image correspond to the intensity of different energy ranges of transmitted x-rays. Thus, a dual-energy analysis may be performed on adjacent image lines, yielding the effective atomic number of the attenuating material using known algorithms.

Figure 2:
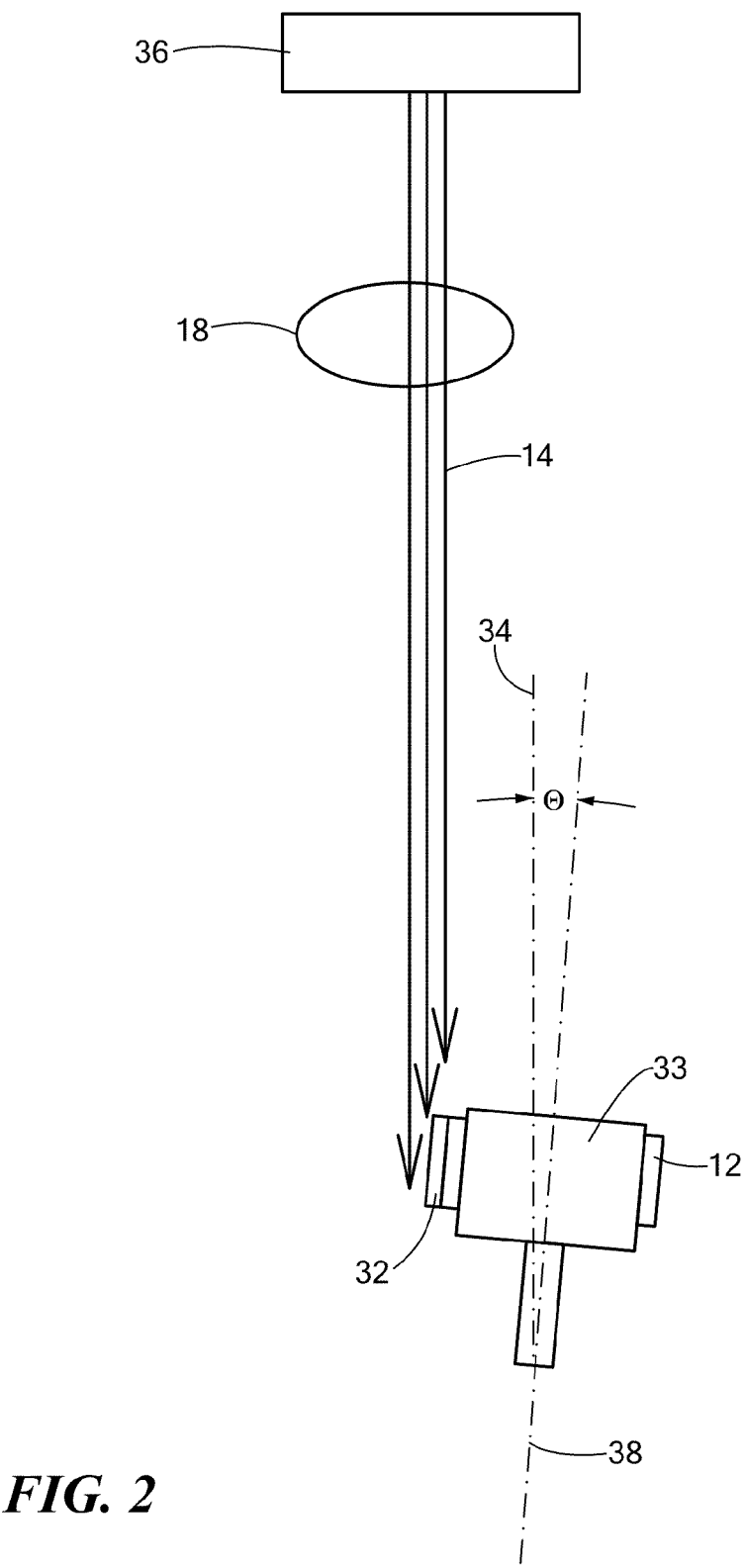
FIG. 2 shows a relative orientation of a scintillation dot relative to an incident beam, in accordance with an embodiment of the present invention.

In order to increase the effectiveness of the phosphor dot 10 to absorb the x-rays of beam 14, the belt 12 may be oriented as now described with reference to FIG. 2. In this case, the dot 10 consists of a thin strip 32 of scintillating material, with the long dimension of the strip 32 oriented substantially along the beam direction 34 of x-ray beam 14 from x-ray source 36 through inspected object 18. The short dimension of thin strip 32 is substantially parallel to the direction of belt motion. The belt 12, driven by pulley 33, is tilted relative to the fan beam 14 so that the phosphor strip 32 is illuminated at a grazing incidence. The normal to the belt direction of motion is designated by numeral 38. Tilting the phosphor dot increases the stopping power of the phosphor by a factor of $1/\sin\Theta$, where $\Theta$ is the grazing incidence angle of the x-rays with the phosphor.

Figure 3:
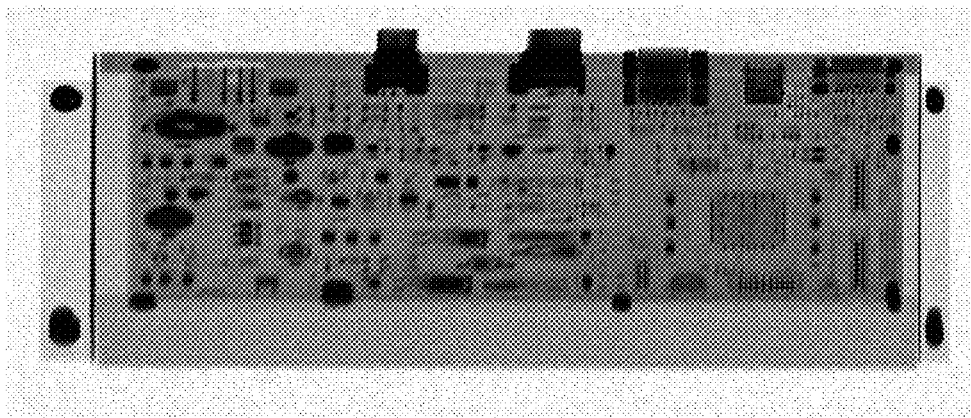
FIG. 3 is an image of a circuit board acquired using an apparatus and method of the present invention.

For example, if the grazing incidence angle is 5 degrees, the stopping power of the phosphor is increased by about a factor of 12 without significantly affecting the imaging resolution of the detector. An example of an image of a circuit board acquired in this manner is shown in FIG. 3, for a 1 mm×8 mm strip of phosphor at 140 kV.

Figure 4:
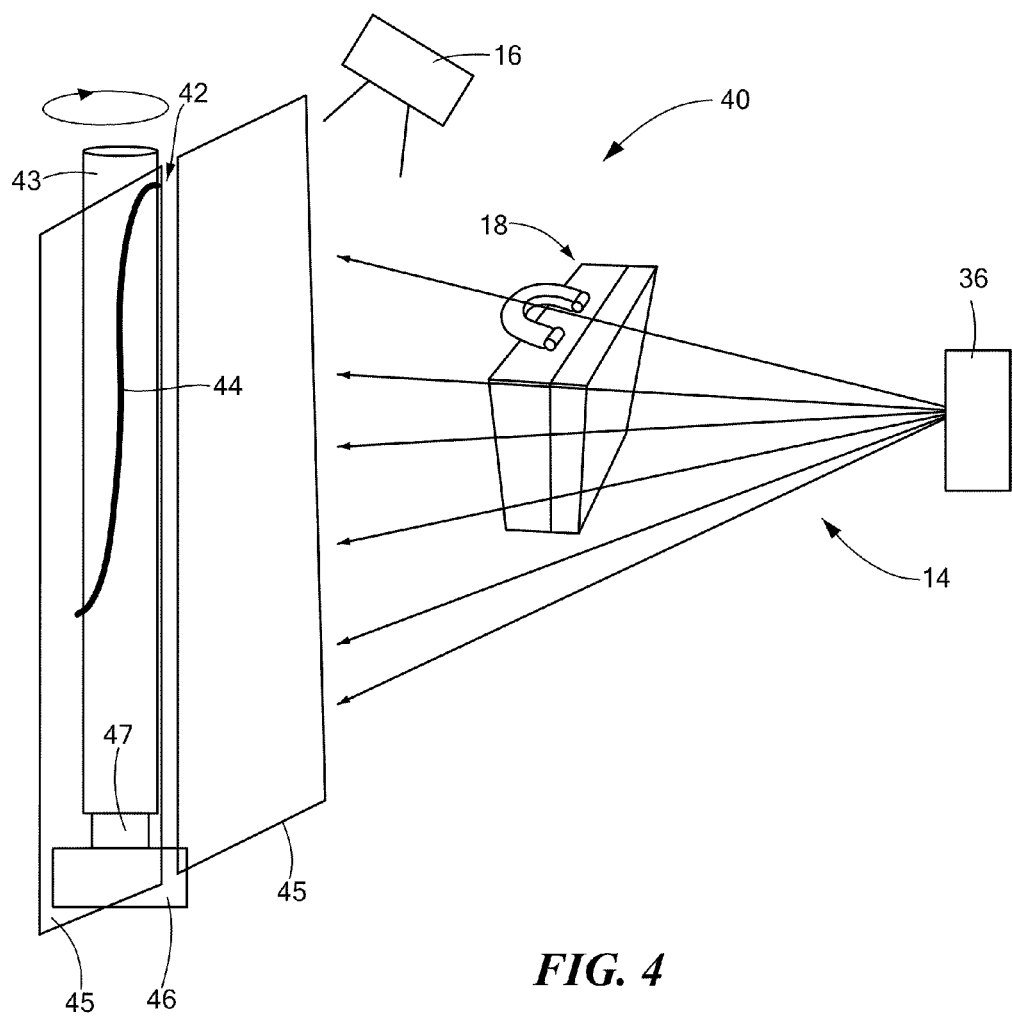
FIG. 4 is a perspective depiction of an apparatus for imaging contents of an object in x-ray transmission, in accordance with an alternate embodiment of the present invention.

A further embodiment of the invention is now described with reference to FIG. 4. In accordance with a transmission imaging system designated generally by numeral 40, motion of a detection region (or "spot") 42 that defines the size of an imaging resolution pixel is achieved by rotating a shaft 43 having a helical scintillation band 44 applied thereon. The helical scintillation band may be painted onto shaft 43 in a low-attenuation binder matrix, or injected into pores microdrilled into the shaft in an amorphous slurry, of phosphor power in a polymeric matrix, as taught, for example, by Kleinmann et al., "An x-ray imaging pixel detector based on scintillator filled pores in a silicon matrix," *Nuclear Instruments and Methods in Physics Research*, vol. 460, pp. 15-19 (2001), and U.S. Pat. No. 7,265,357 (to Khanh, et al.), both of which are incorporated herein by reference. A collimator slit 45 may be interposed between inspected object 18 and detection region 42 to define pixel resolution size. Optical detector 16 detects scintillation, typically in the visible portion of the electromagnetic spectrum, and generates a signal proportional to the x-ray intensity transmitted through object 18 at a particular pixel and giving rise to scintillation at detection region 42. Shaft 43 is rotated by motor 46, and, over the course of a single rotation, detection region 42 (defined by the scintillator material that is visible through the collimation slit when viewed from the source) moves along the entirety, or a specified portion, of the vertical extent of fan beam 14. A rotational encoder 47 may be used to determine the position of the detection region 42 within the cross section of beam 14.

Figure 5:
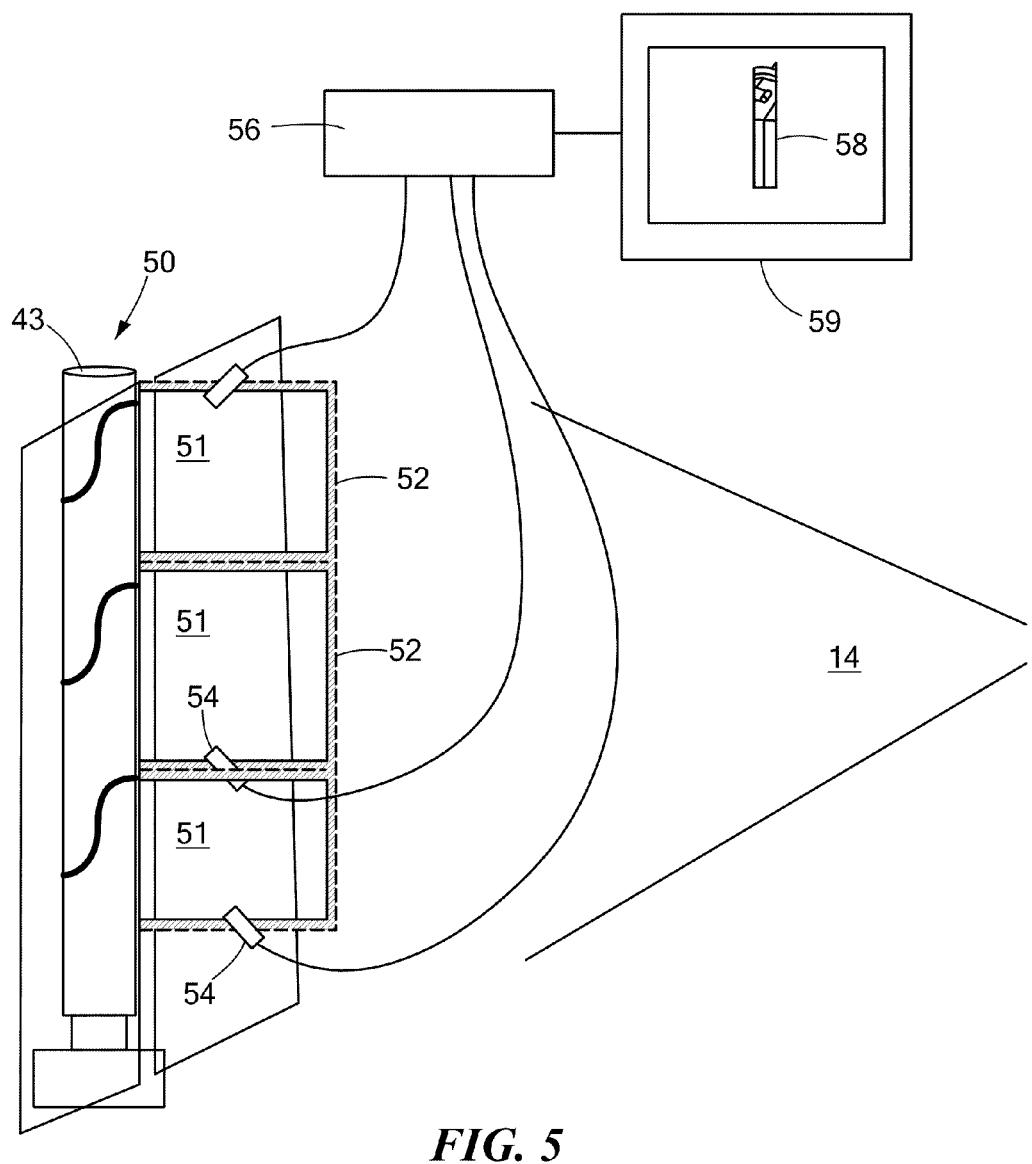
FIG. 5 shows segmented optical readout of multiple pixilated scintillation regions in accordance with an embodiment of the present invention.

In accordance with other embodiments of the invention, described, now, with reference to FIG. 5, an imaging x-ray detector, designated generally by numeral 50, may be segmented, such that each segment subtends a portion of the cross section of an incident beam 14. Each segment of detector 50 is enclosed within a light-tight enclosure 51, the wall 52 of which that faces the incident beam 14 of penetrating radiation is substantially transparent to the penetrating radiation. The interior of each light-tight enclosure 51 is reflective such that visible light emitted by detection region 42 upon incidence of x-rays is effectively captured by a photodetector 54. Detection signals generated by photodetectors 54 are processed by processor 56 to produce an image signal. The image signal may be further processed to derive characteristic features of the inspected object, and may be displayed as an image 58 of transmission through the inspected object on display 59, or otherwise.

In accordance with other embodiments of the invention, multiple detectors may be combined to form L-shaped or U-shaped detectors. Alternating phosphor dots (or regions) may have different sizes in addition to a different phosphor material, yielding for example, alternating low and high resolution image lines. Multiple phosphor dots can be illuminated simultaneously using phosphors that emit at different wavelengths. By combining this with photo-detectors that only detect scintillation light in certain frequency ranges (with the use of filters, for example), the signals coming from each of the dots can be determined and separately measured. This would allow for more efficient use of the flux in the x-ray fan beam, or for a higher resolution detector.

In addition to the one-dimensional detector described above that requires translation of the object being imaged through the fan beam, a two-dimensional detector can be created for use with a cone beam that does not require translation of the object. In this embodiment, the belt and pulleys (or rotating shafts) are mounted inside a box on a translation mechanism that moves them in a perpendicular direction to the direction of motion of the belt. In this way, the phosphor dot samples the transmitted x-rays at all points in a two-dimensional plane, allowing a two-dimensional image of a stationary object to be created.

Applications of the invention include high resolution imaging for nondestructive testing (NDT) applications using a micro-focus x-ray source without requiring costly detector arrays. The size of the phosphor dot can be made arbitrarily small to increase image resolution—albeit with an increase in scan time. Another application is the manufacture of lower cost x-ray systems which could have one or more costly detector arrays replaced with the much cheaper detector described in this disclosure. A further application is to allow for the imaging of very large objects, for which the cost of a segmented detector array might be prohibitive.

All of the heretofore described embodiments of the invention are intended to be merely exemplary and numerous variations and modifications will be apparent to those skilled in the art. All such variations and modifications are intended to be within the scope of the present invention as described by the appended claims.

What is claimed is:

1. An apparatus for imaging transmission of penetrating radiation through an object, the apparatus comprising:
   a. a scintillator region adapted for translation along a path within a cross-section of a beam of penetrating radiation;
   b. a stationary photodetector for detecting light emitted by the scintillator region and generating a detection signal; and
   c. a processor for receiving the detection signal and generating an image signal; and
   d. a display for depicting an image of the transmitted penetrating radiation based on the image signal.

2. An apparatus in accordance with claim 1, further comprising a source of penetrating radiation for generating the beam of penetrating radiation characterized by the beam cross-section.

3. An apparatus in accordance with claim 2, wherein the source of penetrating radiation is an x-ray fan beam source.

4. An apparatus in accordance with claim 1, wherein the scintillator region is a phosphor dot.

5. An apparatus in accordance with claim 4, wherein the phosphor dot is exposed to the beam at a glancing angle with respect to a direction of motion of the dot.

6. An apparatus in accordance with claim 1, wherein the scintillator region is translated over a portion, up to an entirety, of the beam cross-section.

7. An apparatus in accordance with claim 6, wherein the scintillator region is translated on a belt.

8. An apparatus in accordance with claim 1, wherein the scintillator region is a portion of a pattern progressively exposed to the beam.

9. An apparatus in accordance with claim 1, further comprising a sensor for determining an instantaneous disposition of the scintillator region with respect to the beam of penetrating radiation.

10. A method for imaging transmission of penetrating radiation through an object, the method comprising:
    a. translating a scintillator region along a path within a cross section of a beam, the cross section taken in a plane distal to the object with respect to a source;
    b. detecting light emitted by the scintillator region by means of a stationary photodetector and generating a detection signal;
    c. receiving the detection signal and generating an image signal; and
    d. depicting an image of the transmitted penetrating radiation based on the image signal.

11. A method in accordance with claim 10, further comprising generating a beam of penetrating radiation characterized by the beam cross-section.

12. A method in accordance with claim 10, wherein the scintillator region is translated over a portion, up to an entirety, of the beam cross-section.

13. A method in accordance with claim 10, wherein the scintillator region is translated on a belt.

14. A method in accordance with claim 10, wherein the scintillator region is a portion of a pattern progressively exposed to the beam.

15. A method in accordance with claim 10, further comprising determining an instantaneous disposition of the scintillator region with respect to the beam of penetrating radiation.

16. A method in accordance with claim 10, wherein translating the scintillator region includes exposing a phosphor dot to the beam at a glancing angle with respect to a direction of motion of the phosphor dot.

* * * * *